(12) United States Patent
Ben-Tzur et al.

(10) Patent No.: US 10,282,466 B2
(45) Date of Patent: May 7, 2019

(54) MACHINE PROCESSING OF SEARCH QUERY BASED ON GRAMMAR RULES

(71) Applicant: Samsung Electronics Co., Ltd., Suwon-si, Gyeonggi-do (KR)

(72) Inventors: Jonathan Ben-Tzur, Sunnyvale, CA (US); Eric Glover, Palo Alto, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 310 days.

(21) Appl. No.: 15/396,648

(22) Filed: Dec. 31, 2016

(65) Prior Publication Data

US 2017/0193095 A1 Jul. 6, 2017

Related U.S. Application Data

(60) Provisional application No. 62/274,087, filed on Dec. 31, 2015.

(51) Int. Cl.
*G06F 17/30* (2006.01)
*G06F 17/27* (2006.01)

(52) U.S. Cl.
CPC ...... *G06F 17/30696* (2013.01); *G06F 17/274* (2013.01); *G06F 17/2705* (2013.01); *G06F 17/277* (2013.01); *G06F 17/278* (2013.01); *G06F 17/30622* (2013.01); *G06F 17/30699* (2013.01); *G06F 17/30705* (2013.01)

(58) Field of Classification Search
CPC ....................................................... G06F 17/30
USPC ........................................................ 707/722
See application file for complete search history.

(56) References Cited

U.S. PATENT DOCUMENTS

| | | | | |
|---|---|---|---|---|
| 8,856,096 | B2 * | 10/2014 | Marchisio | G06F 17/30731 707/706 |
| 2010/0228693 | A1 * | 9/2010 | Dawson | G06F 17/2705 706/12 |
| 2011/0184946 | A1 * | 7/2011 | Hennum | G06F 17/30672 707/728 |
| 2012/0095822 | A1 * | 4/2012 | Chiocchi | G06Q 30/0207 705/14.26 |
| 2012/0278339 | A1 * | 11/2012 | Wang | G06F 17/30241 707/748 |
| 2014/0365525 | A1 * | 12/2014 | Pfeifer | G06F 17/30539 707/777 |
| 2015/0286747 | A1 * | 10/2015 | Anastasakos | G06F 17/30917 707/776 |

(Continued)

*Primary Examiner* — Kim T Nguyen
(74) *Attorney, Agent, or Firm* — Jefferson IP Law, LLP

(57) ABSTRACT

A search server stores a plurality of keywords, each associated with an entity type. The server stores grammar rules, each specifying one or more entity types. The server receives a search query with search terms and generates tokens by splitting the search terms, each token associated with a token position that indicates a location of the token within the query. The server generates n-grams. Each n-gram is associated with a start token position and an end token position. The server determines entity types for n-grams that correspond to the keywords and generates a mapping that maps the received entity types and the start token positions of the n-grams that correspond with the received entity types to the end token positions of the n-grams that correspond with the received entity types. The server identifies grammar rules based on the mapping and transmits a result based on the identified grammar rules.

20 Claims, 5 Drawing Sheets

(56) References Cited

U.S. PATENT DOCUMENTS

| | | | | |
|---|---|---|---|---|
| 2015/0324425 A1* | 11/2015 | Behzadi | .............. | G06F 17/3087 707/759 |
| 2015/0332670 A1* | 11/2015 | Akbacak | ............... | G10L 15/063 704/9 |
| 2015/0356088 A1* | 12/2015 | Berkhin | .............. | G06F 17/3053 707/748 |
| 2015/0370859 A1* | 12/2015 | Bakir | ................ | G06F 17/30528 707/706 |

* cited by examiner

MACHINE PROCESSING OF SEARCH QUERY BASED ON GRAMMAR RULES

CROSS-REFERENCE TO RELATED APPLICATIONS

This application claims the benefit of U.S. Provisional Application No. 62/274,087, filed on Dec. 31, 2015. The entire disclosure of the application referenced above is incorporated by reference.

FIELD

This disclosure relates to identifying grammar rules that match a search query.

BACKGROUND

Search systems provide search results in response to receiving search queries. A search system can receive a search query from a mobile computing device, a desktop computer, or a server. Some search systems use various grammar rules to determine the search results. Search systems that use rules may compare the search query with each rule to determine whether the rule applies to the search query. If a particular rule applies to the search query, the search system can retrieve search results that correspond with the rule. Checking for grammar rules can be a computationally intensive endeavor. For example, some search systems represent each grammar rule as a tree and then traverse each tree to determine whether the search query matches the grammar rule. In this example, generating and traversing trees may require extensive computing resources and can take a non-trivial amount of time.

SUMMARY

In some examples, a search server of the present disclosure comprises a network communication device, a storage device, and a processing device. The storage device comprises a keyword data store that stores a plurality of keywords. Each keyword is associated with an entity type, the entity type representing a category of entities, an entity being a physical object or a logical object. The storage device also comprises a grammar data store that stores grammar rules. Each grammar rule specifies one or more entity types and each grammar rule is associated with an access mechanism that provides access to an application. The processing device executes computer-readable instructions that, when executed by the processing device, cause the processing device to receive a search request via the network communication device, the search request comprising a search query with one or more search terms. The processing device generates tokens by splitting the search terms with a defined delimiter, wherein each token is associated with a token position that indicates a location of the token within the search query.

The processing device generates n-grams by selecting individual tokens and/or contiguous sequences of tokens, wherein each n-gram is associated with a start token position that indicates a start location of the first token of the n-gram within the search query and an end token position that indicates an end location of the last token of the n-gram within the search query. The processing device then queries the keyword data store with the n-grams and receives the entity types for n-grams that correspond with the keywords stored in the keyword data store. Additionally, the processing device generates a mapping that maps the received entity types and the start token positions of the n-grams that correspond with the received entity types to the end token positions of the n-grams that correspond with the received entity types. The processing device identifies grammar rules that match the search query by querying the grammar data store for grammar rules that specify the entity types included in the mapping. The processing device transmits a search result object that comprises access mechanisms that are associated with the grammar rules that match the search query.

In some examples, a server of the present disclosure categorizes search queries. The server comprises a network communication device, a storage device, and a processing device. The storage device comprises a keyword data store that stores a plurality of keywords, wherein each keyword is associated with an entity type, the entity type representing a category of entities, an entity being a physical object or a logical object. The storage device comprises a grammar data store that stores grammar rules, wherein each grammar rule specifies one or more entity types and each grammar rule is associated with a query category. The processing device executes computer-readable instructions that, when executed by the processing device, cause the processing device to receive a search request via the network communication device, the search request comprising a search query with one or more search terms.

The processing device generates tokens by splitting the search terms with a defined delimiter, wherein each token is associated with a token position that indicates a location of the token within the search query. The processing device generates n-grams by selecting individual tokens and/or contiguous sequences of tokens, wherein each n-gram is associated with a start token position that indicates a start location of the first token of the n-gram within the search query and an end token position that indicates an end location of the last token of the n-gram within the search query. The processing device queries the keyword data store with the n-grams and receives the entity types for n-grams that correspond with the keywords stored in the keyword data store. The processing device generates a mapping that maps the received entity types and the start token positions of the n-grams that correspond with the received entity types to the end token positions of the n-grams that correspond with the received entity types. The processing device identifies grammar rules that match the search query by querying the grammar data store for grammar rules that specify the entity types included in the mapping. The processing device categorizes the search query into the query category associated with the grammar rule that matches the search query.

In some examples, the present disclosure describes a computer program product encoded on a non-transitory computer readable storage medium comprising instructions that when executed by a processing device cause the processing device to perform operations. The operations comprise storing, at the computer readable storage medium, a keyword data store that stores a plurality of keywords, wherein each keyword is associated with an entity type, the entity type representing a category of entities, an entity being a physical object or a logical object. Additionally, the operations comprise storing, at the computer readable storage medium, a grammar data store that stores grammar rules, wherein each grammar rule specifies one or more entity types and each grammar rule is associated with an access mechanism that provides access to an application.

The operations comprise receiving, at the processing device, a search request via a network communication device, the search request comprising a search query with one or more search terms. Additionally, the operations comprise generating, at the processing device, tokens by splitting the search terms with a defined delimiter, wherein each token is associated with a token position that indicates a location of the token within the search query. Additionally, the operations comprise generating, at the processing device, n-grams by selecting individual tokens and/or contiguous sequences of tokens, wherein each n-gram is associated with a start token position that indicates a start location of the first token of the n-gram within the search query and an end token position that indicates an end location of the last token of the n-gram within the search query. The operations further comprise querying, by the processing device, the keyword data store with the n-grams, receiving, at the processing device, the entity types for n-grams that correspond with keywords stored in the keyword data store, and generating, at the processing device, a mapping that maps the received entity types and the start token positions of the n-grams corresponding with the received entity types to the end token positions of the n-grams corresponding with the received entity types. The operations comprise identifying, by the processing device, grammar rules that match the search query by querying the grammar data store for grammar rules that specify the entity types included in the mapping. Additionally, the operations comprise transmitting, via the network communication device, a search result object that comprises access mechanisms that are associated with the grammar rules that match the search query.

BRIEF DESCRIPTION OF THE DRAWINGS

Like reference symbols in the various drawings indicate like elements.

DETAILED DESCRIPTION

Figure 1:
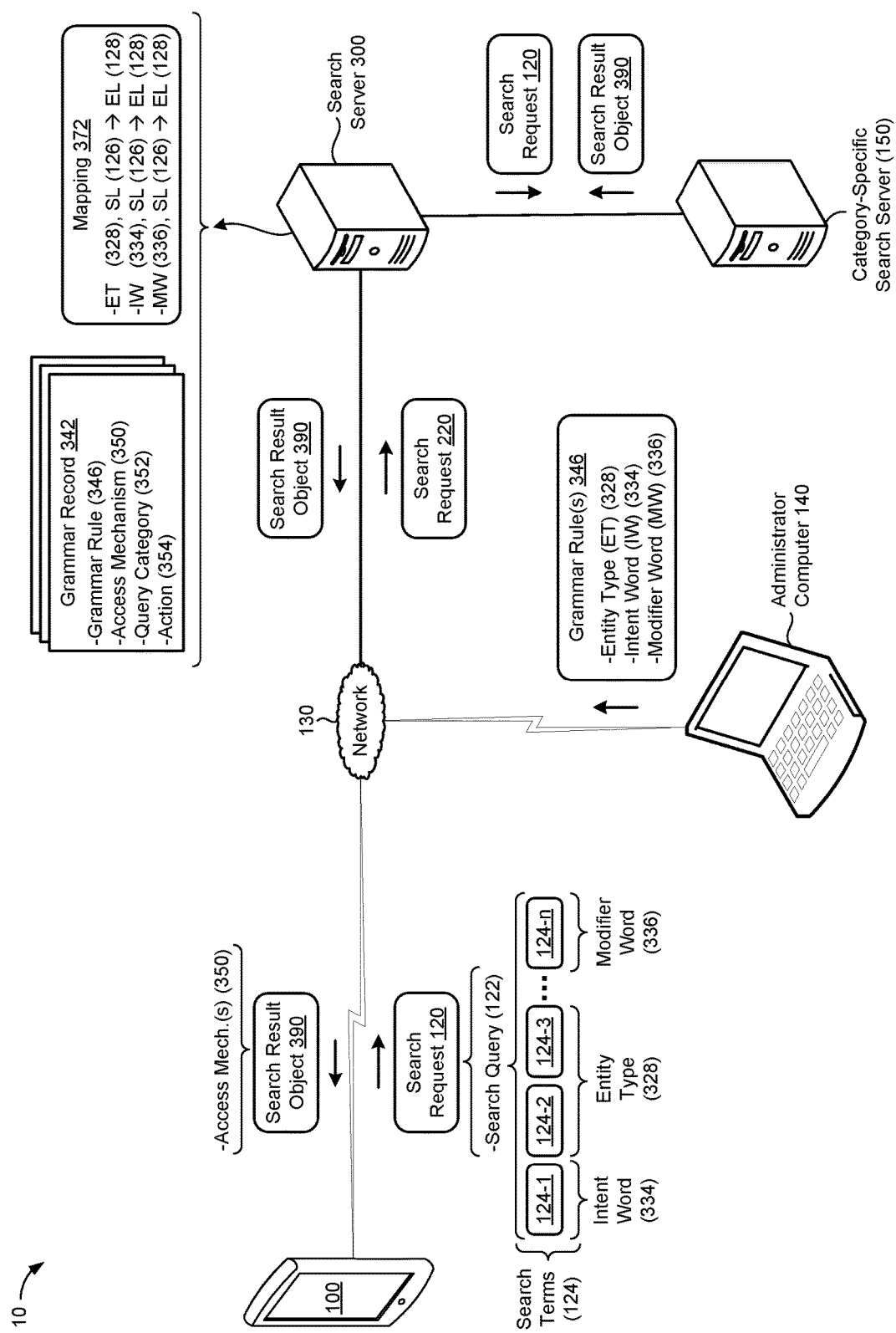
FIG. 1 is a schematic diagram of a search system that provides search results for a search query by identifying grammar rules that match the search query.

The present disclosure provides a search server that utilizes grammar rules to provide search results for search queries. Each grammar rule may be associated with information that the search server can use to provide search results. When the search server receives a search query, the search server identifies a grammar rule that matches the search query. Upon identifying a grammar rule that matches the search query, the search server can use the information associated with the grammar rule to generate the search results.

A grammar rule may specify one or more entity types, intent words, and/or modifier words. An entity type refers to a category of physical or logical objects. Examples of entity types are movie entity type, application entity type, restaurant entity type, etc. Intent words may be words or phrases that are associated with an entity type (e.g., "movie" and "watch" are intent words for movie entity type). Modifier words may be words or phrases that refer to a subset of entities within a set (e.g., "old" in "old movies" may refer to movies that are more than 20 years old). Table 1 illustrates example grammar rules. As shown in Table 1, a first grammar rule may include a movie entity type and an application entity type. The search system may determine that a search query satisfies the first grammar rule if the search query includes a movie name and an application name. Similarly, a second grammar rule may include a movie entity type and an actor entity type. The search system may determine that a search query satisfies the second grammar rule if the search query includes a movie name and an application name.

TABLE 1

Example Grammar Rules and their corresponding actions

| | | Action | |
|---|---|---|---|
| | Grammar Rules | Categorize Query | Launch Application |
| 1 | [movie name] [app name] | Movie query | App specified in query |
| 2 | [movie name] [actor name] | Movie query | Movie Info app |
| 3 | [restaurant name] . . . | Cuisine query | Restaurant Reviews app |

Each grammar rule may be associated with one or more actions that the search system can perform. An action may refer to a set of computer-readable instructions that the search system can execute. In some examples, the action may include categorizing a search query. Referring to Table 1, if the search system determines that the search query satisfies the first grammar rule and/or the second grammar rule, then the search system can categorize the search query as a movie query. In some examples, the action may include selecting an application that is associated with the grammar rule as a search result. Referring to Table 1, if the search system determines that the search query satisfies the third grammar rule, then the search system may select a restaurant reviews application as a search result (e.g., the YELP® application).

A search query matches a particular grammar rule if the search query includes all the entity types, intent words, and modifier words specified by that particular grammar rule. Hence, to determine whether the search query matches any grammar rules, the search system identifies the entity types, intent words, and modifier words specified in the search query. For example, if the search query is "the dark knight imdb," the search server may determine that "the dark knight" is a movie entity and "imdb" is an application entity. The search system generates a mapping that maps the entity types, intent words, and modifier words in a search query and their start location within the search query to their end location within the search query. Table 2 illustrates an example mapping for "the dark knight imdb" search query.

TABLE 2

Mapping Entity Types and their start
location to their end location

| (Entity Type, Start Location) | End Location |
|---|---|
| Movie, 0 | 2 |
| Application, 3 | 3 |

The search system utilizes the mapping to determine whether the search query matches any grammar rules. Specifically, the search system determines that the search query matches a grammar rule if the grammar rule includes all the entity types, intent words, and modifier words that are specified in the mapping. In some examples, the search system may determine that the search query matches a grammar rule only if the grammar rule does not include any additional entity types, intent words, or modifier words. Lastly, in some examples, the search system may determine that the search query matches a grammar rule only if the grammar rule permits the entity types, intent words and modifier words to be in the same order as the mapping. Referring to Tables 1 and 2, the search system can determine that "the dark knight imdb" search query matches the first grammar rule specified in Table 1 but not the second and third grammar rules.

In some implementations, the search system can generate the mapping by generating a set of mapping mechanisms. The search system can generate a first mapping mechanism that maps first and second token positions within the search query to the entity types, intent words, or modifier words that start at the first token position and end at the second token position. The first mapping mechanism may be referred to as a chart parse and the search system can generate the first mapping mechanism by utilizing any technique associated with generating a chart parse (e.g., the Viterbi algorithm, the Earley parser and/or the Cocke-Younger-Kasami (CYK) algorithm, etc.). After generating the first mapping mechanism, the search system can invert the first mapping mechanism to derive a second mapping mechanism. The second mapping mechanism maps entity types, intent words, and modifier words to their start locations and end locations within the search query. The second mapping mechanism may be referred to as an inverse chart parse. After generating the second mapping mechanism, the search system can modify (e.g., augment) the second mapping mechanism to derive a third mapping mechanism (e.g., the mapping discussed above). The third mapping mechanism maps the entity types, intent words, and modifier words, and their start location within the search query to their end location within the search query. The third mapping mechanism may be referred to as a modified (e.g., augmented) inverse chart parse.

FIG. 1 illustrates an example system 10 that may be used to provide search results. The system 10 includes a mobile computing device 100 and a search server 300. The mobile computing device 100 and the search server 300 may communicate via a network 130. In general, the mobile computing device 100 sends a search request 120 to the search server 300. The search request 120 includes a search query 122 with one or more search terms 124. The search request 120 can also include contextual data (e.g., location, time of day, etc.). The search server 300 receives the search request 120 and determines search results for the search query 122. Upon determining the search results, the search server 300 generates a search result object 390 to communicate the search results to the mobile computing device 100.

The system 10 may include an administrator computer 140 that can be used to configure the search server 300. For example, an administrator of the search server 300 may use the administrator computer 140 to send various grammar rules 346 to the search server 300. The search server 300 can receive the grammar rules 346 and store the grammar rules 346 in grammar records 342. Each grammar rule 346 can define a set of entity types 328. An entity type 328 may refer to a category of logical or physical objects. Examples of entity types 328 are movies, restaurants, points of interest, etc. Some grammar rules 346 may include intent words 334 that are associated with an entity type 328 (e.g., "movie" and "watch" are intent words for the movie entity type). Some grammar rules 346 may include modifier words 336 that refer to a subset of entities within a particular set of entities (e.g., "old" in "old movies" may refer to movies that are more than 20 years old). See FIGS. 2A-B for example grammar rules 346.

The search server 300 can utilize the grammar rules 346 to determine the search results. For example, each grammar rule 346 may be associated with an access mechanism 350. The access mechanism 350 may include a string that identifies an application and can be used to access an application. The search server 300 can determine whether the search query 122 satisfies any of the grammar rules 346. If the search query 122 satisfies a particular grammar rule 346, the search server 300 can select the access mechanism 350 associated with that particular grammar rule 346 as a search result. The search query 122 satisfies a particular grammar rule 346 if the search query 122 includes the entity types 328, intent words 334, and modifier words 336 included in the grammar rule 346. However, the search query 122 does not satisfy a grammar rule 346 if the search query 122 is missing an entity type 328, intent word 334, or modifier word 336 defined by a grammar rule 346. In the example of FIG. 1, the search server 300 stores each grammar rule 346 in a grammar record 342. However, the search server 300 may store the grammar rules 346 in other ways.

The search query 122 may include various search terms 124. In some scenarios, some search terms 124 can correspond with entities that have an entity type 328. Some search terms 124 may specify intent words 334 or modifier words 336. In the example of FIG. 1, a first search term 124-1 specifies an intent word 334 (e.g., "watch"). Furthermore, a second search term 124-2 and a third search term 124-3 correspond with an entity (e.g., "the goonies") that is associated with an entity type 328 (e.g., movie entity). Moreover, an nth search term 124-n specifies a modifier word 336 (e.g., free). Consequently, the search query 122 may be "watch the goonies free." The search server 300 identifies all the entity types 328, intent words 334 and modifier words 336 specified in the search query 122.

The search server 300 generates a mapping 372 that maps the entity types 328, intent words 334, or modifier words 336 in the search query 122, and their start location 126 within the search query 122 to their end location 128 within the search query 122. The start location 126 of an entity type 328, intent word 334, or modifier word 336 refers to a position within the search query 122 where the entity type 328, intent word 334, or modifier word 334 starts. Similarly, the end location 128 of an entity type 328, intent word 334, or modifier word 336 refers to a position within the search query 122 where the entity type 328, intent word 334, or modifier word 334 ends. Table 3 illustrates the entity types 328, intent words 334, and modifier words 336 that the search server 300 can identify for the "watch the goonies free" search query 122. Table 4 illustrates a mapping 372 for the "watch the goonies free" search query 122.

TABLE 3

Entity Types 328, Intent Words 334, and Modifier Words 336 for "watch the goonies free" search query 122

| 0 | 1 | 2 | 3 |
|---|---|---|---|
| Watch | The | Goonies | Free |
| Movie Intent Word | | Movie Entity Type | Movie Modifier Word |

TABLE 4

Example mapping 372 for "watch the goonies free" search query 122

| (Entity Type, Intent Word, or Modifier Word), (Start Location 126) | End Location 128 |
|---|---|
| Movie Intent Word, 0 | 0 |
| Movie Entity Type, 1 | 2 |
| Movie Modifier Word, 3 | 3 |

The search server 300 utilizes the mapping 372 to determine whether the search query 122 matches any grammar rules 346. Specifically, the search server 300 identifies grammar rules 346 that include all the entity types 328, intent words 334, and modifier words 336 specified in the mapping 372. In some implementations, the search server 300 can identify the matching grammar rules 346 by filtering out grammar rules 346 that do not include all the entity types 328, intent words 334, and modifier words 336 specified in the mapping 372. The search server 300 can filter out additional grammar rules 346 that do not allow the entity types 328, intent words 334, and modifier words 336 to appear in the same order as the mapping 372. Referring to the example of Table 4, the search server 300 can filter out grammar rules 346 that do not include a movie intent word, a movie entity type, and a movie modifier word. Furthermore, the search server 300 can filter out a grammar rule 346 if the grammar rule 346 specifies the entity types 328, intent words 334, and modifier words 336 in a different order from the mapping 372.

In some implementations, each grammar rule 346 may be associated with a query category 352. Upon identifying a particular grammar rule 346 that matches the search query 122, the search server 300 can select the query category 352 associated with that particular grammar rule 346. The search server 300 can send the search request 120 to a category-specific search server 150 that provides search results for the selected query category 352. The category-specific search server 150 refers to a search server that may be configured to provide search results for search queries 122 in a particular query category 352. For example, the category-specific search server 150 may be configured to provide search results for search queries 122 that are in a movies category, a cuisine category, a restaurant category, a travel category, etc. In response to sending the search request 120 to the category-specific search server 150, the search server 300 can receive the search result object 390 from the category-specific search server 150 and transmit the search result object 390 to the mobile computing device 100. Alternatively, the category-specific search server 150 may transmit the search result object 390 to the mobile computing device 100.

Broadly speaking, each grammar rule 346 may be associated with an action 354 that the search server 300 can perform. An action 354 may refer to a set of computer-readable instructions that the search server 300 can execute. In some examples, the action 354 may be to categorize the search query 122 into the query category 352 associated with the grammar rule 346. In some examples, the action 354 may be to select the access mechanism 350 associated with the grammar rule 346 as a search result. The action 354 can include various other operations. Upon identifying a particular grammar rule 346 that matches the search query 122, the search server 300 can perform the action 354 associated with that particular grammar rule 346.

Figure 2A:
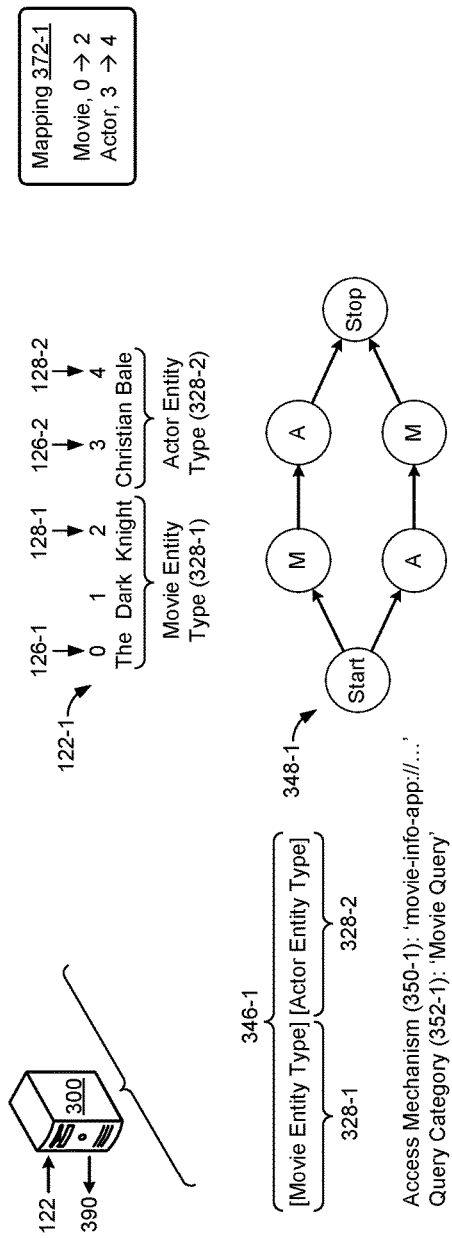
FIG. 2A is a diagram that illustrates an example search query and an example grammar rule.
Figure 2B:
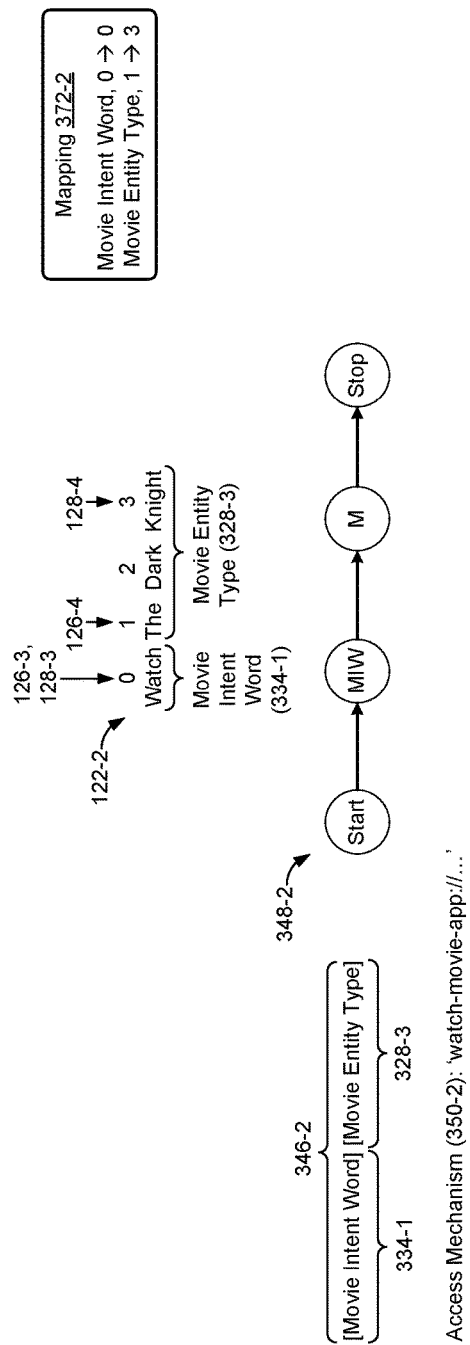
FIG. 2B is a diagram that illustrates another example search query and another example grammar rule.

FIGS. 2A-B illustrate example search queries 122-1, 122-2 and example grammar rules 346-1, 346-2 that match the search queries 122-1, 122-2, respectively. Referring to FIG. 2A, the search server 300 receives "The Dark Knight Christian Bale" as a first search query 122-1. The search server 300 identifies "The Dark Knight" as a movie entity type 328-1 and "Christian Bale" as an actor entity type 328-2. In this example, the movie entity type 328-1 has a start location 126-1 of '0' and an end location 128-1 of '2'. Similarly, the actor entity type 328-2 has a start location 126-2 of '3' and an end location 128-2 of '4'. Upon identifying the entity types 328-1, 328-2 in the first search query 122-1, the search server 300 generates a first mapping 372-1. The first mapping 372-1 maps the entity types 328-1, 328-2 and their start locations 126-1, 126-2 to their end locations 128-1, 128-2.

In the example of FIG. 2A, the search server utilizes the first mapping 372-1 to determine that the first search query 122-1 matches the first grammar rule 346-1. The first grammar rule 346-1 defines a set of entity types 328 that include a movie entity type 328-1 and an actor entity type 328-2. Since the first mapping 372-1 indicates that the first search query 122-1 includes the movie entity type 328-1 and the actor entity type 328-2, the first search query 122-1 matches the first grammar rule 346-1. The first grammar rule 346-1 may be associated with a first access mechanism 350-1. The search server 300 can transmit the first access mechanism 350-1 to the mobile computing device 100 as a search result. Alternatively, the search server 300 can categorize the first search query 122-1 into the first query category 352-1 (e.g., movie category) associated with the first grammar rule 346-1. Thereafter, the search server 300 can transmit the search query 122 to a category-specific search server 150 that is configured to provide search results for search queries 122 that are in the first movie category 352-1.

The search server 300 can represent the first grammar rule 346-1 as a first grammar tree 348-1. The first grammar tree 348-1 is a graphical representation of the first grammar rule 346-1. The first grammar tree 348-1 includes a root node that represents a starting point for the first grammar rule 346-1. The first grammar tree 348-1 includes a leaf node that represents an end point for the first grammar rule 346-1. The first grammar tree 348-1 includes various intermediate nodes that represent the entity types 328-1, 328-2 in the first grammar rule 346-1. As illustrated by the first grammar tree 348-1, the order in which the first search query 122-1 includes the entity types 328-1, 328-2 is irrelevant. In other words, the first grammar rule 346-1 can match the first search query 122-1 even if the actor entity type 328-2 appears before the movie entity type 328-1 in the first search query 122-1.

Referring to the example of FIG. 2B, the search server 300 receives "Watch The Dark Knight" as a second search query 122-2. The search server 300 identifies "Watch" as a movie intent word 334-1 and "The Dark Knight" as a movie entity type 328-3. In this example, the movie intent word 334-1 has a start location 126-3 of '0' and an end location 128-3 of '0'. Similarly, the movie entity type 328-3 has a start location 126-4 of '1' and an end location 128-4 of '3'. Upon identifying the movie intent word 334-1 and the movie entity type 328-3, the search server 300 generates a second mapping 372-2. The second mapping 372-2 maps the movie intent word 334-1, the movie entity type 328-3, and their respective start locations 126-3, 126-4 to their respective end locations 128-3, 128-4.

In the example of FIG. 2B, the search server 300 utilizes the second mapping 372-2 to determine that the second search query 122-2 matches the second grammar rule 346-2. The second grammar rule 346-2 requires a movie intent word 334-1 and a movie entity type 328-3. Since the second mapping 372-2 indicates that the second search query 122-2 includes the movie intent word 334-1 and the movie entity type 328-3, the second search query 122-2 matches the second grammar rule 346-2. The second grammar rule 346-2 may be associated with a second access mechanism 350-2. The search server 300 can transmit the second access mechanism 350-2 to the mobile computing device 100 as a search result. Alternatively, the search server 300 can categorize the second search query 122-2 into the second query category 352-2 (e.g., movie category) associated with the second grammar rule 346-2. Thereafter, the search server 300 can transmit the second search query 122-2 to a category-specific search server 150 that is configured to provide search results for search queries 122 that are in the second movie category 350-2.

The search server 300 can represent the second grammar rule 346-2 as a second grammar tree 348-2. The second grammar tree 348-2 is a graphical representation of the second grammar rule 346-2. The second grammar tree 348-2 includes a root node that represents a starting point for the second grammar rule 346-2. The second grammar tree 348-2 includes a leaf node that represents an end point for the second grammar rule 346-2. The second grammar tree 348-2 includes various intermediate nodes that represent the movie intent word 334-1 and the movie entity type 328-3 in the second grammar rule 346-2. As illustrated by the second grammar tree 348-2, the order in which the second search query 122-2 includes the movie intent word 334-1 and the movie entity type 328-2 may be relevant. In other words, the second grammar rule 346-2 may not have matched the second search query 122-2 if the movie entity type 328-3 appeared before the movie intent word 334-1.

Figure 3:
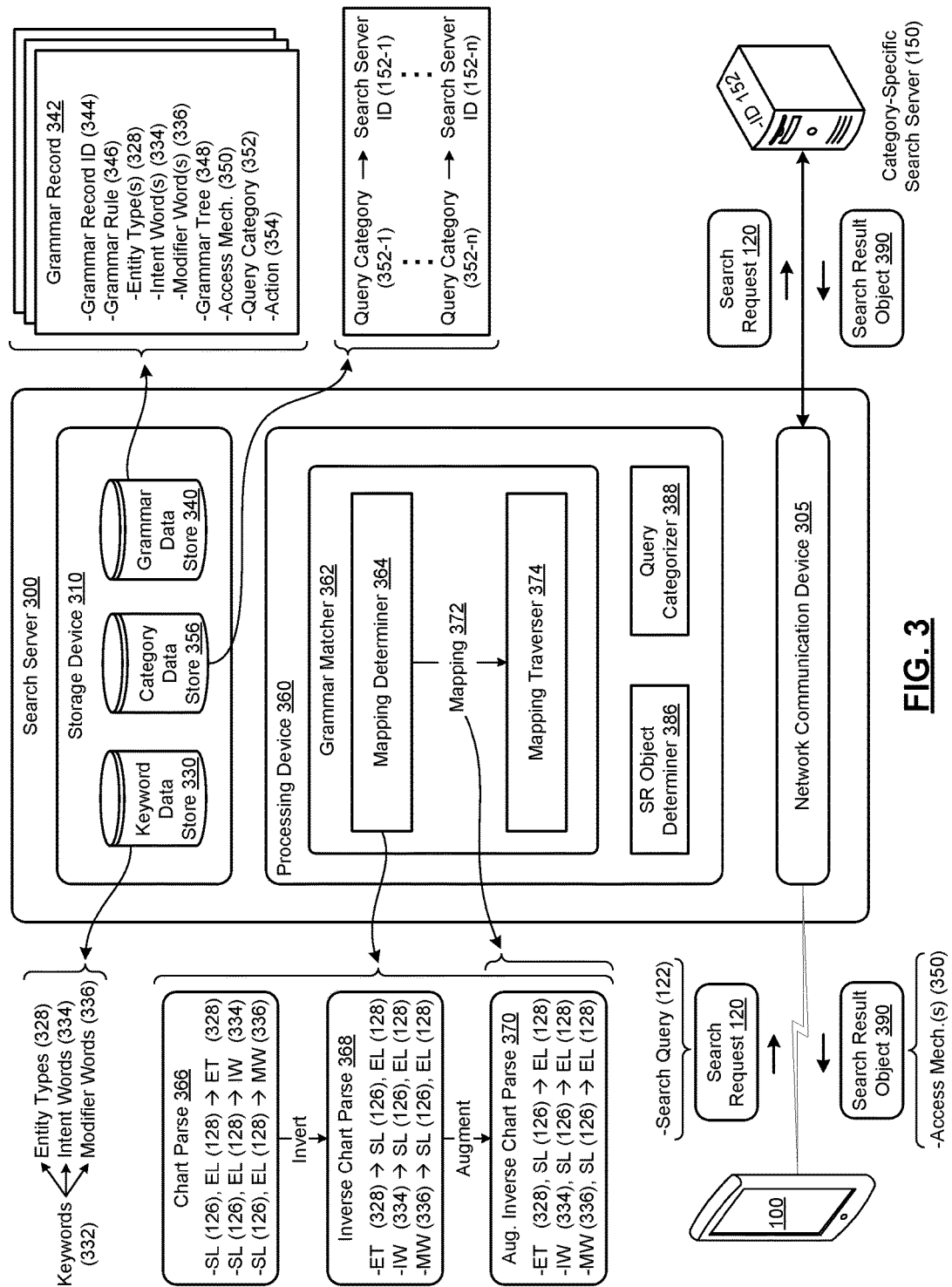
FIG. 3 is a block diagram of a search server that identifies grammar rules that match a search query and provides search results based on the matching grammar rules.

FIG. 3 is an example block diagram of the search server 300. The search server 300 may include a network communication device 305, a storage device 310 and a processing device 360. The search server 300 may be implemented by a cloud computing platform. The cloud computing platform may include a collection of remote computing services. The cloud computing platform may include computing resources (e.g., the processing device 360). The computing resources may include physical servers that have physical central processing units (pCPUs). The cloud computing resources may include storage resources (e.g., the storage device 310). The storage resources may include database servers that support NoSQL, MySQL, Oracle, SQL Server, or the like. The cloud computing platform may include networking resources (e.g. the network communication device 305). Example cloud computing platforms include Amazon Web Services®, Google Cloud Platform®, Microsoft AZURE™, and Alibaba Aliyun™.

The network communication device 305 communicates with a network (e.g., the network 130 shown in FIG. 1). The network communication device 305 may include a communication interface that performs wired communication (e.g., via Ethernet, Universal Serial Bus (USB) or fiber-optic cables). The network communication device 305 may perform wireless communication (e.g., via Wi-Fi, Bluetooth, Bluetooth Low Energy (BLE), Near Field Communications (NFC), ZigBee, a cellular network, or satellites). The network communication device 305 may include a transceiver. The transceiver may operate in accordance with an Institute of Electrical and Electronics Engineers (IEEE) specification (e.g., IEEE 802.3 or IEEE 802.11). The transceiver may operate in accordance with a 3rd Generation Partnership Project (3GPP) specification (e.g., Code Division Multiple Access (CDMA), Long Term Evolution (LTE) or LTE-Advanced). The transceiver may operate in accordance with a Universal Serial Bus (USB) specification (e.g., via a USB port).

The storage device 310 stores data. The storage device 310 may include one or more computer readable storage mediums. For example, the storage device 310 may include solid state memory devices, hard disk memory devices, optical disk drives, read-only memory, etc. The storage device 310 may be connected to the processing device 360 via a bus and/or a network. Different storage mediums within the storage device 310 may be located at the same physical location (e.g., in the same data center, same rack, or same housing). Different storage mediums of the storage device 310 may be distributed (e.g., in different data centers, different racks, or different housings). The storage device 310 may implement (e.g., store) a keyword data store 330, a grammar data store 340, and a category data store 356.

The keyword data store 330 can be used to identify entity types 328, intent words 334, and modifier words 336 in a search query 122. The keyword data store 330 stores keywords 332. A keyword 332 may refer to a string of characters, a single word, or a phrase that includes more than one word. Each keyword 332 may be associated with an entity type 328, intent word 334, or modifier word 336. An entity refers to a physical or logical object. An entity type refers to a category of entities. For example, the keywords 332 "The Dark Knight" and "The Goonies" may be associated with movie entity types 328. Similarly, the keywords 332 "New York City" and "San Francisco" may be associated with location entity types 328. An intent word 334 may refer to words or phrases that are associated with an entity type. For example, the keywords 332 "movie" and "watch" are intent words 334 for movies. Some keywords 332 can be characterized as modifier words 336. A modifier word 336 may refer to words or phrases that refer to a subset of entities within a set of entities. For example, "old" in "old movies" may refer to movies that are more than 20 years old.

The keyword data store 330 can receive a text string and determine whether the text string matches any of the keywords 332 stored in the keyword data store 330. If the text string matches a keyword 332 and the matching keyword 332 is associated with an entity type 328, then the keyword data store 330 can provide an indication that the text string is associated with the entity type 328. If the matching keyword 332 is an intent word 334, then the keyword data store 330 can provide an indication that the text string is an intent word 334. Similarly, if the matching keyword 332 is a modifier word 336, then the keyword data store 330 can provide an indication that the text string is a modifier word 336. The keyword data store 330 can utilize any suitable data structure to store the keywords 332 and their associated entity types 328. For example, the keyword data store 330 may include one or more databases, indices (e.g., inverted indices), tables, Look-Up Tables (LUT), files, or other data structures.

The grammar data store 340 stores grammar records 342. Each grammar record 342 includes a grammar record ID 344. The grammar record ID 344 may include an alphanumeric string that identifies the grammar record 342. Each grammar record 342 corresponds with a grammar rule 346. Each grammar rule 346 may define a set of entity types 328. Some grammar rules 346 may include intent words 334 that are associated with an entity type (e.g., "movie" and "watch" are intent words for the movie entity type). Some grammar rules 346 may include modifier words 336 that refer to a subset of entities within a particular set of entities (e.g., "old" in "old movies" may refer to movies that are more than 20 years old). See FIGS. 2A-B for example grammar rules 346.

A grammar record 342 may store a grammar tree 348. The grammar tree 348 may be a graphical representation of the grammar rule 346. The grammar tree 348 may resemble a tree data structure. For example, the grammar tree 348 may include a root node that represents a starting point for the grammar rule 346, a leaf node that represents an end point for the grammar rule 346 and intermediate nodes that represent the entity types 328, intent words 334, and modifier words 336 in the grammar rule 346. The search server 300 can generate the grammar tree 348 based on the grammar rule 346. Alternatively, the search server 300 may receive the grammar tree 348 (e.g., from the administrator computer 140 shown in FIG. 1). The grammar records 342 may store the grammar trees 348 in addition to the grammar rules 346 or as an alternative to the grammar rules 346.

A grammar record 342 can store information that is associated with a grammar rule 346. For example, a grammar record 342 may store an access mechanism 350. The access mechanism 350 may include a string that identifies an application and can be used to access an application. The access mechanism 350 may include a uniform resource identifier (URI) that identifies an application. The application may be a native application that can be installed on a mobile computing device. Alternatively, the application may be a web application that can be hosted by a web server. The URI may be referred to as an application URL or an access URL. In some scenarios, the access mechanism 350 may point to a particular state of the application (e.g., a state that is different from a default launch state of the application). An access mechanism 350 that points to a particular state of the application may be referred to as a state access mechanism. Upon determining that the search query 122 satisfies a grammar rule 346, the search server 300 can transmit the access mechanism 350 associated with the grammar rule 346 as a search result.

A grammar record 342 may store a query category 352. The query category 352 may be associated with the grammar rule 346. A query category 352 may be referred to as a 'vertical'. Upon determining that the search query 122 satisfies a particular grammar rule 346, the search server 300 can categorize the search query 122 into the query category 352 associated with that particular grammar rule 346. Referring to FIG. 2A, upon determining that the first search query 122-1 satisfies the first grammar rule 346-1, the search server 300 can categorize the first search query 122-1 as a movie query. The search server 300 may categorize some search queries 122 into multiple query categories 352. For example, a search query 122 that includes the search terms "The Dark Knight" may satisfy a grammar rule 346 that is associated with a movie category and another grammar rule 346 that is associated with a comic book category. Other example query categories 352 for the search query 122 include a restaurant query, a cuisine query, a travel query, a hotel query, etc.

Broadly speaking, a grammar record 342 may store an action 354 that is associated with the grammar rule 346. An action 354 may refer to a set of computer-readable instructions that the search server 300 can execute if the search query 122 satisfies the grammar rule 346. In some implementations, the action 354 may be to select the access mechanism 350 as a search result and transmit the access mechanism 350 to the mobile computing device 100. In some implementations, the action 354 may be to categorize the search query 122 into the query category 352 associated with the grammar rule 346 and transmit the search query 122 to a category-specific search server 150. For example, if the query category 352 indicates that the search query 122 is a travel-related search query, then the search server 300 can transmit the search query 122 to a category-specific search server 150 that is configured to provide search results for travel-related search queries.

In some implementations, the search server 300 may combine the grammar rules 346 (e.g., all the grammar rules 346) to form a merged grammar rule. The search server 300 may store the merged grammar rule in the grammar data store 340. The search server 300 may merge the grammar rules 346 by merging (e.g., combining) the individual grammar trees 348 to form a merged grammar tree. The merged grammar tree may be considered a graphical representation of all the grammar rules 346. The search server 300 may combine the grammar rules 346 upon determining that there is a significant overlap between the grammar rules 346. In other words, the search server 300 can combine the grammar rules 346 when the grammar rules 346 specify one or more of the same entity types 328, intent words 334, and modifier words 336. Example techniques that the search server 300 can employ to combine the grammar rules 346 are disclosed in U.S. patent application Ser. No. 15/396,643, filed on Dec. 31, 2016, the entire contents of which are incorporated by reference.

The category data store 356 may store a list of query categories 352-1 . . . 352-n in association with a list of search server IDs 152-1 . . . 152-n. Each query category 352 may be associated with a search server ID 152 that identifies a particular category-specific search server 150. In some implementations, a search server ID 152 may include an Internet Protocol (IP) address that corresponds with a category-specific search server 150. Alternatively, the search server 152 may include a name of the corresponding category-specific search server 150. The name may have been assigned by a Domain Name System (DNS). The category data store 356 may include one or more databases, indices (e.g., inverted indices), tables, Look-Up Tables (LUT), files, or other data structures. For example, the category data store 356 may include a LUT that stores the query categories 352 as keys and the search server IDs 152 as values. Alternatively, the category data store 356 may include an index that maps query categories 352 to the search server IDs 152.

The processing device 360 may include a collection of one or more computing processors that execute computer readable instructions. The computing processors of the processing device 360 may operate independently or in a distributed manner. The computing processors may be connected via a bus and/or a network. The computing processors may be located in the same physical device (e.g., same housing). The computing processors may be located in different physical devices (e.g., different housings, for example, in a distributed computing system). A computing processor may include physical central processing units (pCPUs). A pCPU may execute computer-readable instructions to implement virtual central processing units (vCPUs). The processing device 360 may execute computer-readable instructions corresponding with a grammar matcher 362. The processing device 360 may also execute computer-readable instructions for a search results object determiner 386 and/or a query categorizer 388.

The grammar matcher 362 determines whether the search query 122 matches any of the grammar rules 346. The grammar matcher 362 may utilize the grammar trees 348 to determine whether the search query 122 matches any of the grammar rules 346. The grammar matcher 362 may include a mapping determiner 364 that determines a mapping 372 based on the search query 122. The mapping 372 maps the entity types 328, intent words 334, and modifier words 336, and their start location 126 within the search query 122 to their end location 128. The grammar matcher 362 may also include a mapping traverser 374 that utilizes (e.g., traverses) the mapping 372 to identify the grammar rules 346 that the search query 122 satisfies.

The mapping determiner 364 may include a query analyzer (not shown) that analyzes the search query 122. The search query 122 may include one or more search terms. The query analyzer can tokenize the search query 122 by identifying parsed tokens. The query analyzer may perform stemming by reducing words in the search query 122 to their stem word or root word. The query analyzer can perform synonymization by identifying synonyms of search terms in the search query 122. The query analyzer can also perform stop word removal by removing commonly occurring words from the search query 122 (e.g., by removing "a," "and," etc.).

The query analyzer can use the tokens to generate n-grams. An n-gram may include one or more tokens. An n-gram that includes only one token may be referred to as a unigram. An n-gram that includes two tokens may be referred to as a bigram. The query analyzer can generate n-grams by grouping sequential tokens. In other words, the query analyzer can generate n-grams by grouping tokens that appear in a sequence. For example, if the search query 122 is "The Dark Knight Christian Bale," then the query analyzer may generate the following unigrams: "The," "Dark," "Knight," "Christian," and "Bale." Similarly, the query analyzer may generate the following bigrams: "The Dark," "Dark Knight," "Knight Christian," and "Christian Bale." Furthermore, the query analyzer can generate the following trigrams: "The Dark Knight," "Dark Knight Christian," and "Knight Christian Bale." Moreover, the query analyzer can generate the following 4-grams: "The Dark Knight Christian" and "Dark Knight Christian Bale." Lastly, the query analyzer can generate the following 5-gram: "The Dark Knight Christian Bale."

The query analyzer can identify the entity types 328 associated with the n-grams. The query analyzer can query the keyword data store 330 with the n-grams and receive the entity types 328 of the n-grams. For example, one of the n-grams may include the words "The Dark Knight." Upon querying the keyword data store 330 with "The Dark Knight," the query analyzer can receive an indication that "The Dark Knight" is a movie entity. The query analyzer can also determine whether an n-gram is an intent word 334 or a modifier word 336. To determine whether an n-gram is an intent word 334 or a modifier word 336, the query analyzer can query the keyword data store 330 with the n-gram. If the n-gram is an intent word 334 or a modifier word 336, then the query analyzer can receive an indication that the n-gram is an intent word 334 or a modifier word 336. Table 5 illustrates an example search query 122 and the entity types 328 that the query analyzer identified for the search query 122. In the example of Table 5, the search query 122 is "The Dark Knight Christian Bale."

TABLE 5

Example Search Query 122
with Entity Types 328

| 0 | 1 | 2 | 3 | 4 |
|---|---|---|---|---|
| The | Dark | Knight | Christian | Bale |
| Movie Entity Type 328 (0, 2) | | | Actor Entity Type 328 (3, 4) | |

The mapping determiner 364 can generate a first mapping mechanism that maps a start location 126 and an end location 128 to an entity type 328, an intent word 334, or a modifier word 336. The start location 126 may be referred to as a start token position at which the entity type 328, the intent word 334, or the modifier word 336 starts. Similarly, the end location 128 may be referred to as an end token position at which the entity type 328, the intent word 334, or the modifier word 336 ends. The first mapping mechanism may be referred to as a chart parse 366. The mapping determiner 364 can use various techniques to generate the first mapping mechanism. In some implementations, the mapping determiner 364 can generate the first mapping mechanism by using the Viterbi algorithm or any variant of the Viterbi algorithm. Alternatively, the mapping determiner 364 can generate the first mapping mechanism by using any technique associated with the Earley parser. Moreover, the mapping determiner 364 can generate the first mapping mechanism by using the Cocke-Younger-Kasami (CYK) algorithm or a variant of the CYK algorithm. Table 6 shows an example of the first mapping mechanism. In the example of Table 6, the first mapping mechanism is for "The Dark Knight Christian Bale" query.

TABLE 6

First Mapping Mechanism (e.g., Chart Parse) maps Start
Location 126 and End Location 128 to Entity Type 328,
Intent Word 334, or Modifier Word 336

| (Start Location, End Location) | Entity Type, Intent Word or Modifier Word |
|---|---|
| (0, 2) | Movie Entity Type |
| (3, 4) | Actor Entity Type |

The first mapping mechanism can be represented as a function that receives a start location 126 (e.g., a start token position) and an end location 128 (e.g., an end token position) as inputs and outputs an entity type 328, intent word 334, or modifier word 336 that starts at the start location 126 and ends at the end location 128. Equation 1 illustrates a mathematical representation of the first mapping mechanism as a function.

$$f_1(x, y) \rightarrow \text{Entity Type, Intent Word or Modifier Word} \quad (1)$$

where x=start location 126; and y=end location 128

The mapping determiner 364 can generate a second mapping mechanism that maps entity types 328, intent words 334, or modifier words 336 to their start location 126 (e.g., a token start position) and their end location 128 (e.g., a token end position). The mapping determiner 364 can generate the second mapping mechanism by inverting the first mapping mechanism. Consequently, the second mapping mechanism may be referred to as an inverse of the first mapping mechanism. If the first mapping mechanism is referred to as a chart parse 366, then the second mapping mechanism may be referred to as an inverse chart parse 368. Table 7 illustrates an example of the second mapping mechanism. In the example of Table 7, the second mapping mechanism is for "The Dark Knight Christian Bale" query.

TABLE 7

Second Mapping Mechanism (e.g., Inverse Chart Parse) maps Entity Types, Intent Words, and Modifier Words to Start Location and End Location

| Entity Type, Intent Word or Modifier Word | (Start Location, End Location) |
|---|---|
| Movie Entity Type | (0, 2) |
| Actor Entity Type | (3, 4) |

The second mapping mechanism can be represented as a function that receives an entity type 328, an intent word 334 or a modifier word 336 as an input and outputs a start location 126 (e.g., a start token position) and an end location 128 (e.g., an end token position). The start location 126 and the end location 128 represent a range of tokens throughout which the entity type 328, the intent word 334 or the modifier word 336 span. Equation 2 illustrates a mathematical representation of the second mapping mechanism as a function.

$$f_2(\text{Entity Type, Intent Word or Modifier Word}) \rightarrow x,y \quad (2)$$

where x=Start Location 126; and y=End Location 128

The mapping determiner 364 can generate a third mapping mechanism that maps entity types 328, intent words 334 or modifier words 336, and a start location 126 to an end location 128. The mapping determiner 364 can generate the third mapping mechanism by augmenting (e.g., transforming or modifying) the second mapping mechanism. If the second mapping mechanism is referred to as an inverse chart parse 368, then the third mapping mechanism may be referred to as an augmented inverse chart parse 370. Table 8 illustrates an example of the third mapping mechanism. In the example of Table 8, the third mapping mechanism is for "The Dark Knight Christian Bale" query.

TABLE 8

Third Mapping Mechanism (e.g., augmented inverse chart parse) maps Entity Types, Intent Words or Modifier Words and their Start Token Positions to their End Token Positions

| (Entity Type, Intent Word or Modifier Word), Start Location 126 | End Location 128 |
|---|---|
| Movie Entity Type, 0 | 2 |
| Actor Entity Type, 3 | 4 |

The third mapping mechanism can be represented as a function that receives an entity type 328, an intent word 334 or a modifier word 336 along with a start location 126. The start location 126 represents a location within the search query 122 where the entity type 328, intent word 334 or modifier word 336 starts. The function outputs an end location 128 that represents a location within the search query 122 where the entity type 328, intent word 334 or modifier word 336 stops. Equation 3 illustrates a mathematical representation of the third mapping mechanism as a function.

$$f_3(\text{Entity Type, Intent Word or Modifier Word, x}) \rightarrow y \quad (3)$$

where x=Start Location 126; and y=End Location 128

In some implementations, the mapping determiner 364 can generate the mapping 372 (e.g., the third mapping mechanism) without explicitly generating the first mapping mechanism and the second mapping mechanism. In other words, the mapping determiner 382 may generate the augmented inverse chart parse 370 without explicitly generating the chart parse 366 and the inverse chart parse 368. If the mapping determiner 364 explicitly generates the first mapping mechanism and the second mapping mechanism, then the mapping determiner 364 can purge the first mapping mechanism and the second mapping mechanism upon generating the third mapping mechanism. The grammar matcher 362 can use the third mapping mechanism to determine the grammar rules 346 that the search query 122 satisfies. A benefit of using the third mapping mechanism is that the third mapping mechanism can be stored as a relatively compact data structure. Due to its compact nature, the third mapping mechanism requires relatively less memory to store. Hence, the third mapping mechanism can be stored in a cache of the processing device 360 instead of being stored in the storage device 310.

A benefit of using the third mapping mechanism is that generating the third mapping mechanism is an O(n) operation, where n is the number of tokens in the search query 122. Another benefit of using the third mapping mechanism, instead of the first mapping mechanism, is that traversing the third mapping mechanism is approximately an O(depth× length) operation instead of an O(depth^length) operation, where depth refers to the depth of the third mapping mechanism and length refers to the length of the search query 122. Depth of the third mapping mechanism refers to the average number of entity types 328 associated with a token.

The mapping traverser 374 utilizes the mapping 372 to determine the grammar rules 346 that match the search query 122. Utilizing the mapping 372 refers to utilizing the third mapping mechanism (e.g., the augmented inverse chart parse 370). In general, the mapping traverser 374 can search through the grammar records 342 to identify grammar rules 346 that include all the entity types 328, intent words 334, and modifier words 336 that the mapping 372 includes. Thereafter, the mapping traverser 374 can filter out grammar rules 346 that require additional entity types 328, intent words 334, or modifier words 336 that the mapping 372 does not include. Lastly, the mapping traverser 374 can filter out grammar rules 346 that do not allow the entity types 328, intent words 334, and modifier words 336 to be in the same sequence as the mapping 372. See FIG. 4C for an example method that the mapping traverser 374 can execute to determine the grammar rules 346 that the search query 122 matches. Upon determining the grammar rules 346 that match the search query 122, the mapping traverser 374 can send the grammar record IDs 344 for the matching grammar rules 346 to the search result object determiner 386 and/or the query categorizer 388.

The search results object determiner 386 generates the search result object 390. The search result object 390 may include access mechanisms 350 that correspond with grammar rules 346 that match the search query 122. The search results object determiner 386 may receive grammar record IDs 344 for the matching grammar rules 346 from the mapping traverser 374. Upon receiving the grammar record IDs 344, the search results object determiner 386 can retrieve the access mechanisms 350 that correspond with the matching grammar rules 346. The search results object determiner 386 can instantiate a data container that represents the search results object 390 and write the access mechanisms 350 to data container. The data container may be a JSON object, an XML file, or the like. The search server 300 can transmit the search result object 390 to the mobile computing device 100 via the network communication device 305.

In some implementations, the query categorizer 388 categorizes the search query 122 based on the grammar rule 346 that matches the search query 122. The query categorizer 388 can categorize the search query 122 into the query category 352 associated with the matching grammar rule 346. Upon categorizing the search query 122 into a particular query category 352, the query categorizer 388 can query the category data store 356 with that particular query category 352 and receive a search server ID 152 associated with that particular query category 352. The query categorizer 388 can send the search query 122 to the category-specific search server 150 identified by the search server ID 152. For example, if the query category 352 is travel, then the query categorizer 388 can send the search query 122 to a category-specific search server 150 that processes travel-related search queries 122. Upon transmitting the search query 122 to the category-specific search server 150, the search server 300 may receive the search result object 390 from the category-specific search server 150. The search server 300 can transmit the search result object 390 to the mobile computing device 100 upon receiving the search result object 390 from the category-specific search server 150. Alternatively, the category-specific search server 150 may bypass the search server 300 and transmit the search result object 390 to the mobile computing device 100.

Figure 4A:
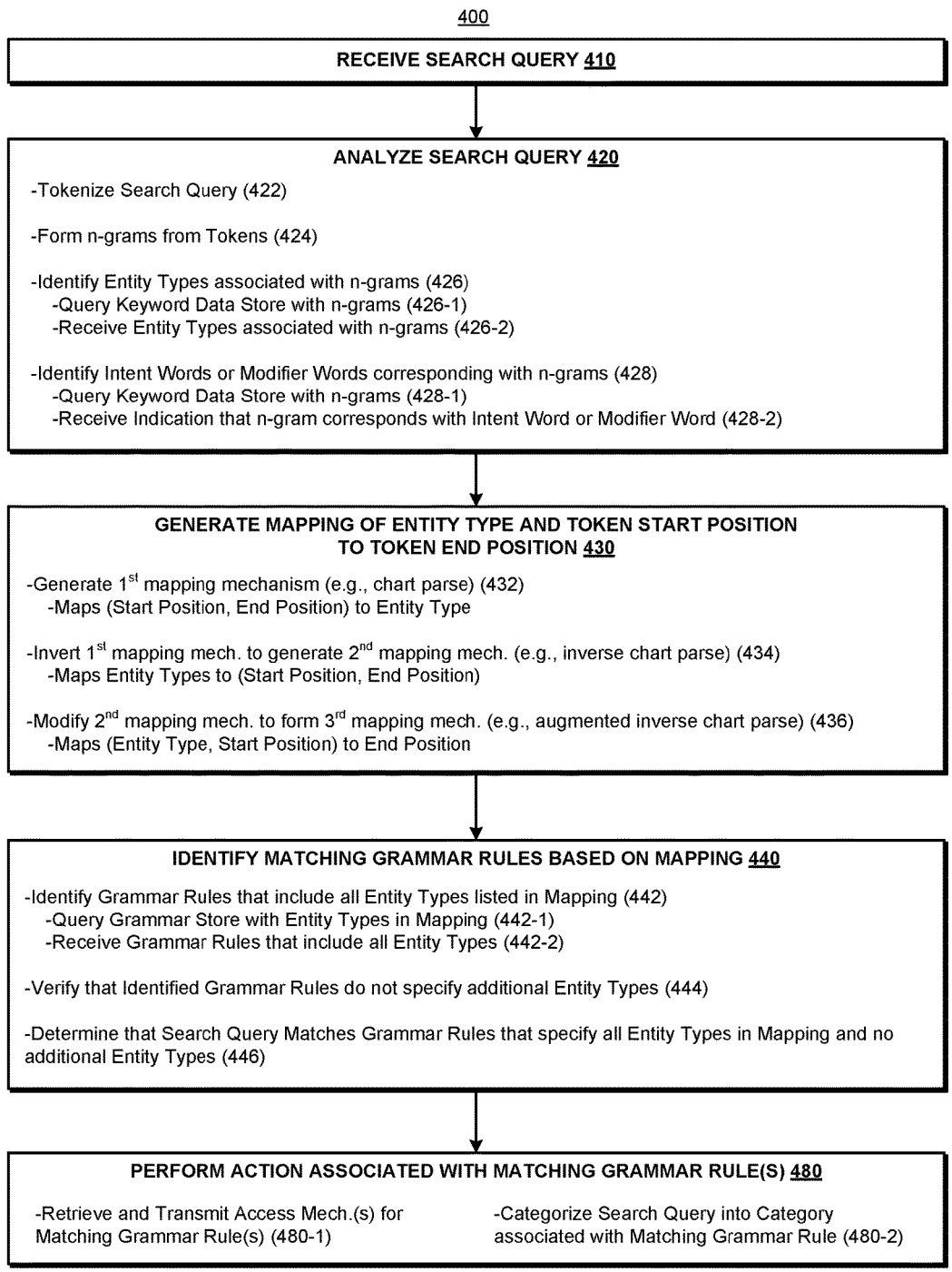
FIG. 4A is a diagram of a method that can be executed by the search server to identify grammar rules that match a search query.

FIG. 4A illustrates an example method 400 for identifying grammar rules that match a search query. The method 400 can be executed by a search server (e.g., the search server 300 shown in FIG. 3). The method 400 may be implemented as a set of computer-readable instructions that are executed by a processing device (e.g., the processing device 360 shown in FIG. 3). Generally, the search server receives a search query (at 410). The search server analyzes the search query and identifies the entity types of the entities specified in the search query (at 420). At 430, the search server generates a mapping of the entity types and their start locations within the search query to their end locations in the search query. The search server utilizes the mapping to identify grammar rules that match the search query (at 440). If the search query matches a grammar rule, the search server performs an action associated with the grammar rule (at 480).

Referring to 410, the search server receives a search query. The search server may receive a search request that includes the search query. The search request can include additional information. For example, the search request may include contextual data that indicates a context of a mobile computing device that initiated the search request. Examples of contextual data include application IDs that identify the applications installed on the mobile computing device, location of the device, time of day, etc. The search server may receive the search query directly from the mobile computing device or through a partner computing system that serves as an intermediary between the search server and the mobile computing device.

At 420, the search server analyzes the search query. The search server analyzes the search query to identify the entity type of any entity specified in the search query. The search server also analyzes the search query to identify any intent words or modifier words specified in the search query. Generally, the search server tokenizes the search query to generate tokens (at 422). At 424, the search server utilizes the tokens to form n-grams. Upon forming the n-grams, the search server identifies the entity types associated with the n-grams (at 426). The search server can also determine whether any of the n-grams correspond with an intent word or a modifier word (at 428).

Referring to 422, the search server can tokenize the search query to generate parsed tokens. The search server can use a tokenizer to tokenize the search query. The tokenizer can use various techniques to generate the tokens. In some examples, the tokenizer generates the tokens by splitting the characters of the search query with a given space delimiter (e.g., " "). The search server can perform various other operations to the search query. For example, the search server may perform stemming by reducing the words in the search query to their stem word or root word. The search server can perform synonym ization by identifying synonyms of search terms in the search query. The search server can also perform stop word removal by removing commonly occurring words from the search query (e.g., by removing "a," "and," etc.). The search server may also identify misspelled words and replace the misspelled words with the correct spelling. Some of the operations described herein may be referred to as 'cleaning' the search query.

Referring to 424, the search server can utilize the tokens to form n-grams. An n-gram may include one or more tokens. An n-gram that includes only one token may be referred to as a unigram. An n-gram that includes two tokens may be referred to as a bigram. N-grams with two or more tokens include tokens that appear sequentially. The search server can form n-grams by selecting individual tokens and/or by selecting tokens that appear in sequence in the search query. Table 9 illustrates an example search query and the n-grams that the search server may generate for the search query. In the example of Table 9, the search query is "The Dark Knight Christian Bale".

TABLE 9

| Example n-grams for a Search Query | |
|---|---|
| Unigrams | "The", "Dark", "Knight", "Christian", "Bale" |
| Bigrams | "The Dark", "Dark Knight", "Knight Christian", "Christian Bale" |
| Trigrams | "The Dark Knight", "Dark Knight Christian", "Knight Christian Bale" |
| 4-grams | "The Dark Knight Christian", "Dark Knight Christian Bale" |
| 5-gram | "The Dark Knight Christian Bale" |

At 426, the search server identifies the entity types associated with the n-grams. To identify the entity types associated with the n-grams, the search server may utilize a keyword data store that stores various keywords and their corresponding entity types (e.g., the keyword data store 330 shown in FIG. 3). The search server can query the keyword data store with the n-grams (at 426-1). For example, the keyword data store may include a lookup table that maps keywords to entity types. The search server can query the lookup table with the n-grams. The keyword data store may include other data structures that the search server can query (e.g., an index, for example, an inverted index). For n-grams that correspond with an entity type, the keyword data store can return the entity type associated with the n-gram. Consequently, the search server receives entity types for n-grams that correspond with entities (at 426-2). Table 10 shows the entity types for an example search query. In the example of Table 10, the search query is "The Dark Knight Christian Bale."

TABLE 10

Example Search Query with Entity Types

| 0 | 1 | 2 | 3 | 4 |
|---|---|---|---|---|
| The | Dark | Knight | Christian | Bale |
| Movie Entity Type (0, 2) | | | Actor Entity Type (3, 4) | |

At 428, the search server can determine whether any of the n-grams (e.g., unigrams) are intent words or modifier words. To determine whether any of the n-grams are intent words or modifier words, the search server may utilize a keyword data store that stores intent words and modifier words (e.g., the keyword data store 330 shown in FIG. 3). The search server can query the keyword data store with the n-grams (at 428-1). Upon receiving the query, the keyword data store can perform a search for intent words and modifier words that match the n-grams. If an n-gram matches an intent word or a modifier word, the keyword data store can provide an indication that the n-gram is an intent word or a modifier word. Consequently, the search server receives an indication for n-grams that are intent words or modifier words (at 428-2). In the example of Table 10, the search server determines that none of the n-grams are intent words or modifier words.

At 430, the search server generates a mapping (e.g., the mapping 372 shown in FIG. 3) of entity types and the start location of the entity types to the end location of the entity types. The start location of an entity type may refer to a token position where the entity type starts. The token position where the entity type starts may be referred to as the start token position. Similarly, the end location of an entity type may refer to a token position where the entity type ends. The token position where the entity type ends may be referred to as the end token position. The mapping can also map intent words and the start location of the intent words to the end location of the intent words. Similarly, the mapping can also map modifier words and the start location of the modifier words to the end location of the modifier words. Table 11 shows an example mapping for "The Dark Knight Christian Bale" search query.

TABLE 11

Mapping of Entity Types and Start Location of Entity Types to End Location of Entity Types

| Entity Type, Start Location | End Location |
|---|---|
| Movie Entity Type, 0 | 2 |
| Actor Entity Type, 3 | 4 |

The search server can use a variety of techniques to generate the mapping. In some implementations, the search server can perform the operations indicated by 432-436 to generate the mapping. At 432, the search server can generate a first mapping mechanism that maps a start token position and an end token position to an entity type, an intent word or a modifier word. The first mapping mechanism may be referred to as a chart parse. The search server can use various techniques to generate the first mapping mechanism. In some implementations, the search server can generate the first mapping mechanism by using the Viterbi algorithm or any variant of the Viterbi algorithm. Alternatively, the search server can generate the first mapping mechanism by using any technique associated with the Earley parser. Moreover, the search server can generate the first mapping mechanism by using the Cocke-Younger-Kasami (CYK) algorithm or a variant of the CYK algorithm. Table 12 shows an example of the first mapping mechanism for "The Dark Knight Christian Bale" search query.

TABLE 12

First Mapping Mechanism (e.g., Chart Parse) maps Start Token Positions and End Token Positions to Entity Types, Intent Words and/or Modifier Words

| (Start Position, End Position) | Entity Type, Intent Word or Modifier Word |
|---|---|
| (0, 2) | Movie Entity Type |
| (3, 4) | Actor Entity Type |

The first mapping mechanism can be represented as a function that receives a start token position and an end token position as inputs and outputs an entity type, intent word, or modifier word that spans from the start token position to the end token position. Equation 4 illustrates a mathematical representation of the first mapping mechanism as a function.

$$f_1(x,y) \rightarrow \text{Entity Type, Intent Word or Modifier Word} \quad (4)$$

where x=start token position; and y=end token position

At 434, the search server can generate a second mapping mechanism that maps entity types, intent words, or modifier words to a start token position and an end token position. The search server can generate the second mapping mechanism by inverting the first mapping mechanism. Consequently, the second mapping mechanism may be referred to as an inverse of the first mapping mechanism. If the first mapping mechanism is referred to as a chart parse, then the second mapping mechanism may be referred to as an inverse chart parse. Table 13 illustrates an example of the second mapping mechanism for "The Dark Knight Christian Bale" search query.

TABLE 13

Second Mapping Mechanism (e.g., Inverse Chart Parse) maps Entity Types, Intent Words, and Modifier Words to Start Token Position and End Token Position

| Entity Type, Intent Word, or Modifier Word | (Start Position, End Position) |
|---|---|
| Movie | (0, 2) |
| Actor | (3, 4) |

The second mapping mechanism can be represented as a function that receives an entity type, an intent word, or a modifier word as an input and outputs a start token position and an end token position. The start token position and the end token position represent a range of tokens throughout which the entity type, the intent word or the modifier word span. Equation 5 illustrates a mathematical representation of the second mapping mechanism as a function.

$$f_2(\text{Entity Type, Intent Word or Modifier Word}) \rightarrow x, y \quad (5)$$

where x=start token position; and y=end token position

At 436, the search server generates a third mapping mechanism that maps entity types, intent words, or modifier words, and a token start position to a token end position. The search server can generate the third mapping mechanism by augmenting (e.g., transforming or modifying) the second mapping mechanism. If the second mapping mechanism is referred to as an inverse chart parse, then the third mapping mechanism may be referred to as an augmented inverse chart parse. Table 14 illustrates an example of the third mapping mechanism for the "The Dark Knight Christian Bale" search query.

TABLE 14

Third Mapping Mechanism (e.g., augmented inverse chart parse) maps Entity Types, Intent Words, or Modifier Words and their Start Token Positions to their End Token Positions

| (Entity Type, Intent Word or Modifier Word), Start Position | End Position |
|---|---|
| Movie, 0 | 2 |
| Actor, 3 | 4 |

The third mapping mechanism can be represented as a function that receives an entity type, an intent word, or a modifier word along with a start token position. The start token position represents a location within the search query where the entity type, intent word or modifier word starts. The function outputs an end token position that represents a location within the search query where the entity type, intent word or modifier word stops. Equation 6 illustrates a mathematical representation of the third mapping mechanism as a function.

$$f_3(\text{Entity Type, Intent Word or Modifier Word}, x) \rightarrow y \quad (6)$$

where x=start token position and y=end token position

In some implementations, the search server can generate the third mapping mechanism without explicitly generating the first mapping mechanism and the second mapping mechanism. In other words, the search server may generate the augmented inverse chart parse without explicitly generating the chart parse and the inverse chart parse. If the search server explicitly generates the first mapping mechanism and the second mapping mechanism, then the search server can purge the first mapping mechanism and the second mapping mechanism upon generating the third mapping mechanism. The search server can use the third mapping mechanism to determine the grammar rules that the search query satisfies. A benefit of using the third mapping mechanism is that the third mapping mechanism can be stored as a relatively compact data structure. Due to its compact nature, the third mapping mechanism may be stored using relatively less memory. Hence, the third mapping mechanism can be stored in a cache of the processing device instead of being stored in the storage device.

Figures 4B, 4C:
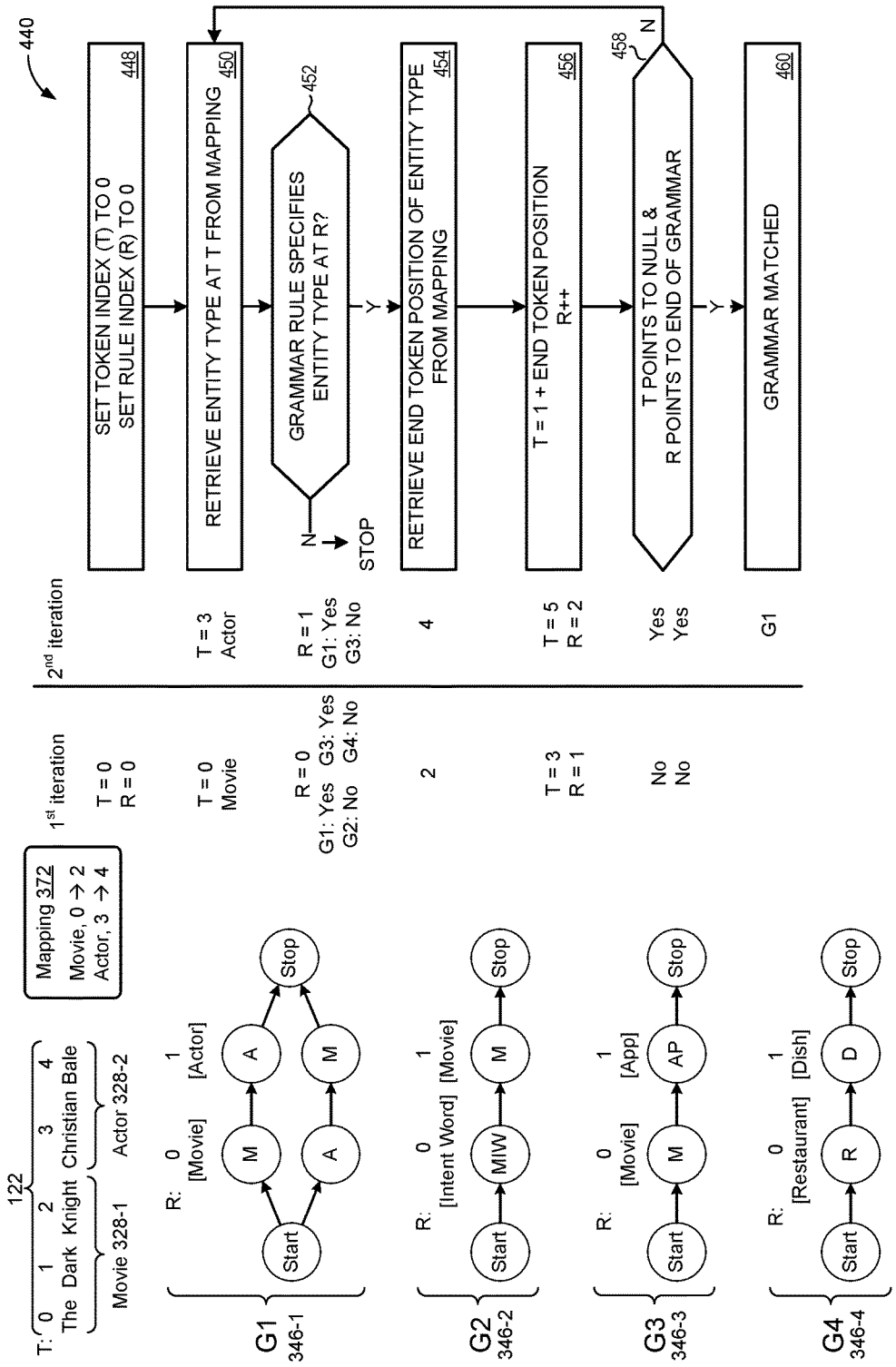
FIG. 4B is a diagram that illustrates an example search query and example grammar rules.
FIG. 4C is a diagram of a method that can be executed by the search server to identify grammar rules that match a search query.

At 440, the search server utilizes the mapping generated at 430 to identify the grammar rules that match the search query. Utilizing the mapping refers to using the third mapping mechanism generated at 436. In other words, utilizing the mapping refers to utilizing the augmented inverse chart parse. At 442, the search server may identify grammar rules that include all entity types, intent words, and modifier words listed in the mapping. For example, the search server can query a grammar data store with entity types, intent words, and modifier words from the mapping (at 442-1). In return, the search server can receive grammar rules that include all the entity types, intent words, and modifier words from the mapping (at 442-2). At 444, the search server may verify that the grammar rules identified at 442 do not include entity types, intent words, or modifier words that are not in the mapping. In other words, the search server may verify that there is a one-to-one correspondence between the mapping and the grammar rules that match the mapping. At 446, the search server may determine that the search query matches grammar rules that specify all the entity types, intent words, and modifier words in the mapping and include no additional entity types, intent words, and modifier words. The search server may perform additional or alternative operations to identify the matching grammar rules based on the mapping. For example, FIG. 4C illustrates an example method that the search server can execute to identify the grammar rules that the search query matches.

At 480, the search server performs an action associated with the grammar rule that matches the search query. In some implementations, the action may be to retrieve an access mechanism associated with the matching grammar rule and transmit the access mechanism to the mobile computing device as a search result (at 480-1). If, at 440, the search server determines that the search query matches multiple grammar rules, then the search server can retrieve the access mechanism for each of the grammar rules. Hence, the search results may include multiple access mechanisms. To transmit the access mechanisms to the mobile computing device, the search server can instantiate a data container, write the access mechanisms to the data container and transmit the data container to the mobile computing device. The data container can be a JSON object, an XML file, or the like. The data container may be referred to as a search result object (e.g., the search result object 390 shown in FIGS. 1 and 3).

In some implementations, the action may be to categorize the search query into a query category associated with the matching grammar rule (480-2). Each grammar rule may be associated with a query category. If, at 440, the search server determines that the search query matches a grammar rule, then the search server can retrieve the query category associated with the matching grammar rule and categorize the search query into the retrieved query category. Upon categorizing the search query into a particular query category, the search server can transmit (e.g., forward) the search request (e.g., search query) to another search server that is associated with that particular query category (e.g., the category-specific search server 150 shown in FIGS. 1 and 3). For example, if the search server categorizes a search query as a travel query, then the search server can transmit the search query to a category-specific search server that is configured to provide search results for travel-related search queries. If the search server categorizes the search query into multiple categories, then the search server may transmit the search query to multiple category-specific search servers. For example, if the search server categorizes a particular search query into a movie category and a book category, then the search server can transmit the search query to a second search server that provides movie-related search results and a third search server that provides book-related search results.

Referring still to 480-2, different query categories may be associated with different category-specific search servers. After categorizing the search query into a particular query category, the search server can identify a particular category-specific search server that processes search queries related to that particular query category. For example, the search server can query a category data store with that particular query category and receive a search server ID (e.g., an IP address) for a particular category-specific search server. The search server can utilize the search server ID to transmit the search query to the corresponding category-specific search server.

The search server may receive search results from the category-specific search server upon transmitting the search query to the category-specific search server. In some implementations, the search server may receive the search result object from the category-specific search server. If the search server receives the search result object from the category-specific search server, the search server can transmit (e.g., forward) the search result object to the mobile computing device without modifying the search result object. Alternatively, the search server may receive access mechanisms from the category-specific search server and write the access mechanisms to a data container that represents a search result object. Upon generating the search result object, the search server can transmit the search result object to the mobile computing device.

FIG. 4B illustrates an example search query 122. In the example of FIG. 4B, the search query 122 includes search terms that correspond with a movie entity type 328-1 and an actor entity type 328-2. The movie entity type 328-1 starts at token position 0 and ends at token position 2. The actor entity type 328-2 starts at token position 3 and ends at token position 4. The mapping 372 maps the entity types 328-1, 328-2 and their start token positions to their end token positions. For example, the mapping 372 maps (movie, 0) to 2. Similarly the mapping 372 maps (actor, 3) to 4. The search server 300 may generate the mapping 372 by executing the operations indicated at block 430 in FIG. 4A. Specifically, the mapping 372 may refer to the third mapping mechanism (e.g., the augmented inverse chart parse) that the search server 300 can generate by executing the operations indicated at 432-436 in FIG. 4A.

FIG. 4B also illustrates four example grammar rules 346-1 . . . 346-4. The first grammar rule 346-1 requires a movie entity type and an actor entity type. As illustrated, the movie entity type and the actor entity type may appear in any order. The second grammar rule 346-2 requires a movie intent word and a movie entity type. The third grammar rule 346-3 requires a movie entity type and an application entity type. Lastly, the fourth grammar rule 346-4 requires a restaurant entity type and a dish entity type.

FIG. 4C illustrates example operations 440 that the search server can perform to identify the matching grammar rule(s). The operations 440 may be a set of computer-readable instructions that the search server can execute. The operations 440 utilize the mapping of entity types and their start token positions to their end token positions (e.g., the mapping 372). At 448, the search server instantiates a token index (T) and sets T to 0. The search server also instantiates a rule index (R) and sets R to 0. At 450, the search server identifies an entity type in the search query that starts at T. In other words, the search server identifies an entity type with a start token position that is equal to T. The search server can query the mapping 372 with T and receive the entity type that starts at T. For example, the search server can query the mapping 372 with '0' and receive 'movie' as the entity type that starts at token position 0.

At 452, the search server determines whether any of the grammar rules 346 include the entity type at a position indicated by the rule index (R). The search server filters out grammar rules 346 that do not specify the entity type at a position indicated by R. The search server includes the remaining grammar rules 346 (i.e., the grammar rules 346 that are not filtered out) into a consideration set. If none of the grammar rules 346 include the entity type at R, then the method 440 stops and the search server determines that the search query does not match any grammar rules 346. Referring to the example of FIG. 4B, the search server can determine whether any of the grammar rules 346-1 . . . 346-4 specify a movie entity type at R=0. In this example, the first grammar rule 346-1 and the third grammar rule 346-3 specify a movie entity type at R=0. The second grammar rule 346-2 and the fourth grammar rule 346-4 do not specify a movie entity type at R=0. Consequently, the search server can filter out the second grammar rule 346-2 and the fourth grammar rule 346-4. In this example, the search server can add the first grammar rule 346-1 and the third grammar rule 346-3 to the consideration set, and exclude the second grammar rule 346-2 and the fourth grammar rule 346-4 from the consideration set.

If any one of the grammar rules 346 includes the entity type at a position indicated by the rule index, then the search server retrieves an end token position for the entity type from the mapping (at 454). The search server can query the mapping 372 with the entity type and the token index (T), and receive an end token position for the entity type. Referring to the example of FIG. 4B, the search server can query the mapping 372 with (Movie, 0) and receive an end token position of '2' for the movie entity type.

At 456, the search server sets the token index to one plus the end token position determined at 454. Moreover, the search server increments the rule index by one (illustrated as R++ in FIG. 4C). Referring to the example of FIG. 4B, the search server sets the token index to 3 (1+2) and increments the rule index from 1 to 2.

At 458, the search server determines whether the token index points to null (e.g., end of search query) and the rule index points to an end of any grammar rule 346 in the consideration set. The search server can determine that the token index points to null if the search server queries the mapping 372 with the token index and the mapping 372 returns null. Referring to the example of FIG. 4B, the search server can query the mapping 372 with '3'. Since the mapping 372 includes (Actor, 3), the token index of 3 does not point to null. Similarly, since the rule index of 2 points to the actor entity type in the first grammar rule 346-1 and the application entity type in the third grammar rule 346-3, the rule index does not point to the end of a grammar rule 346. Since neither of the conditions specified at 458 are met, the search server repeats the operations indicated by 450-458.

During the second iteration of operation 450, the search server identifies the entity type that starts at the token index of 3. The search server can query the mapping 372 with '3' and receive actor as the entity type that starts at token position 3. At 452, the search server determines whether any of the grammar rules 346 in the consideration set include the actor entity type at R=1. The search server removes the third grammar rule 346-3 from the consideration set because the third grammar rule 346-3 does not include the actor entity type at R=1. Since the first grammar rule 346-1 includes the actor entity type at R=1, the search server proceeds to operation 454. At 454, the search server retrieves the end token position of the actor entity type from the mapping 372. The search server can query the mapping 372 with (Actor, 3) and receive 4 as the end token position of the actor entity type. At 456, the search server sets the token index T to 5

(1+4) and the rule index R to 2 (1+1). At 458, the search server determines whether the token index points to null and the rule index points to the end of any grammar rule 346 in the consideration set. The search server can query the mapping 372 with 5 (i.e., the token index). Since the mapping 372 does not include any entity types that start at token position 5, the mapping 372 returns null. Hence, after the second iteration, the token index points to null. Similarly, the rule index of 2 points to the end of the first grammar rule 346-1. Therefore, both the conditions indicated by operation 458 are met.

If, at 458, the search server determines that both conditions are met, the search server determines that the search query matches the grammar rule(s) that are still in the consideration set. In the example of FIG. 4B, the search server determines that the search query 122 matches the first grammar rule 346-1. The search server can perform additional or alternative operations to identify the grammar rules that the search query satisfies.

Once the search server determines that a particular grammar rule 346 does not include an entity type that is in the mapping 372, the search server does not utilize computing resources to determine whether that particular grammar rule 346 includes other entity types that are in the mapping 372. In the example of FIGS. 4B-C, once the search server determines (at 452) that the second grammar rule 346-2 and the fourth grammar rule 346-4 do not include the movie entity type, the search server may not waste additional computing resources in determining whether the second grammar rule 346-2 and the fourth grammar rule 346-4 include the actor entity type.

By not checking each grammar rule 346 for every entity type in the mapping 372, the search server can reduce the amount of time required to identify the grammar rules 346 that match the search query 122. A benefit of using the mapping 372 (e.g., the augmented inverse chart parse) is that the search server is much faster than conventional rule-based search systems at determining that the search query does not match a set of grammar rules. In other words, the search server consumes lesser time and fewer computing resources than conventional rule-based search systems to determine that the search query has failed to match a grammar rule.

Various implementations of the systems and techniques described herein can be realized in digital electronic and/or optical circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, non-transitory computer readable medium, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

Implementations of the subject matter and the functional operations described in this specification can be implemented in digital electronic circuitry, or in computer software, firmware, or hardware, including the structures disclosed in this specification and their structural equivalents, or in combinations of one or more of them. Moreover, subject matter described in this specification can be implemented as one or more computer program products, such as one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The terms "data processing apparatus," "computing device," and "computing processor" encompass all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as an application, program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, one or more aspects of the disclosure can be implemented on a computer having a display device, e.g., a CRT (cathode ray tube), LCD (liquid crystal display) monitor, or touch screen for displaying information to the user and optionally a keyboard and a pointing device, e.g., a mouse or a trackball, by which the user can provide input to the computer. Other kinds of devices can be used to provide interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

One or more aspects of the disclosure can be implemented in a computing system that includes a backend component, e.g., as a data server, or that includes a middleware component, e.g., an application server, or that includes a frontend component, e.g., a client computer having a graphical user interface or a Web browser through which a user can interact with an implementation of the subject matter described in this specification, or any combination of one or more such backend, middleware, or frontend components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specifics, these should not be construed as limitations on the scope of the disclosure or of what may be claimed, but rather as descriptions of features specific to particular implementations of the disclosure. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multi-tasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

A number of implementations have been described. Nevertheless, it will be understood that various modifications may be made without departing from the spirit and scope of the disclosure. Accordingly, other implementations are within the scope of the following claims. For example, the actions recited in the claims can be performed in a different order and still achieve desirable results.

What is claimed is:
1. A search server comprising:
 a network communication device;
 a storage device comprising:
  a keyword data store that stores a plurality of keywords, wherein each keyword is associated with an entity type, the entity type representing a category of entities, an entity being a physical object or a logical object; and
  a grammar data store that stores grammar rules, wherein each grammar rule specifies one or more entity types and each grammar rule is associated with an access mechanism that provides access to an application; and
 a processing device that executes computer-readable instructions that, when executed by the processing device, cause the processing device to:
  receive a search request via the network communication device, the search request comprising a search query with one or more search terms;
  generate tokens by splitting the search terms with a defined delimiter, wherein each token is associated with a token position that indicates a location of the token within the search query;
  generate n-grams by selecting individual tokens and/or contiguous sequences of tokens, wherein each n-gram is associated with a start token position that indicates a start location of the first token of the n-gram within the search query and an end token position that indicates an end location of the last token of the n-gram within the search query;
  query the keyword data store with the n-grams and receive the entity types for n-grams that correspond with the keywords stored in the keyword data store;
  generate a mapping that maps the received entity types and the start token positions of the n-grams that correspond with the received entity types to the end token positions of the n-grams that correspond with the received entity types;
identify grammar rules that match the search query by querying the grammar data store for grammar rules that specify the entity types included in the mapping; and
transmit a search result object that comprises access mechanisms that are associated with the grammar rules that match the search query.

2. The search server of claim 1, wherein generating the mapping comprises:
generating a first mapping mechanism that maps the start token positions and the end token positions of the n-grams to the entity types associated with the n-grams;
inverting the first mapping mechanism to generate a second mapping mechanism that maps the entity types associated with the n-grams to the start token positions and the end token positions of the n-grams; and
modifying the second mapping mechanism to generate a third mapping mechanism that maps the entity types associated with the n-grams and the start token positions of the n-grams to the end token positions of the n-grams.

3. The search server of claim 2, wherein:
generating the first mapping mechanism comprises generating a chart parse;
inverting the first mapping mechanism comprises inverting the chart parse to generate an inverse chart parse; and
modifying the second mapping mechanism comprises augmenting the inverse chart parse to generate an augmented inverse chart parse.

4. The search server of claim 1, wherein identifying the grammar rules that match the search query comprises filtering out grammar rules that do not include all the entity types specified in the mapping.

5. The search server of claim 4, wherein identifying the grammar rules comprises verifying that the grammar rules that include all the entity types specified in the mapping do not include additional entity types that are not specified in the mapping.

6. The search server of claim 5, wherein identifying the grammar rules comprises determining that the search query matches a grammar rule if the grammar rule specifies all the entity types in the mapping and the grammar rule specifies no additional entity types.

7. The search server of claim 1, wherein transmitting the search result object comprises:
instantiating a data container;
retrieving the access mechanisms for the matching grammar rules from the grammar data store; and
writing the access mechanisms to the data container.

8. A server that categorizes search queries, the server comprising:
a network communication device;
a storage device comprising:
a keyword data store that stores a plurality of keywords, wherein each keyword is associated with an entity type, the entity type representing a category of entities, an entity being a physical object or a logical object; and
a grammar data store that stores grammar rules, wherein each grammar rule specifies one or more entity types and each grammar rule is associated with a query category; and a processing device that executes computer-readable instructions that, when executed by the processing device, cause the processing device to:
receive a search request via the network communication device, the search request comprising a search query with one or more search terms;
generate tokens by splitting the search terms with a defined delimiter, wherein each token is associated with a token position that indicates a location of the token within the search query;
generate n-grams by selecting individual tokens and/or contiguous sequences of tokens, wherein each n-gram is associated with a start token position that indicates a start location of the first token of the n-gram within the search query and an end token position that indicates an end location of the last token of the n-gram within the search query;
query the keyword data store with the n-grams and receive the entity types for n-grams that correspond with the keywords stored in the keyword data store;
generate a mapping that maps the received entity types and the start token positions of the n-grams that correspond with the received entity types to the end token positions of the n-grams that correspond with the received entity types;
identify grammar rules that match the search query by querying the grammar data store for grammar rules that specify the entity types included in the mapping; and
categorize the search query into the query category associated with the grammar rule that matches the search query.

9. The server of claim 8, wherein generating the mapping comprises:
generating a first mapping mechanism that maps the start token positions and the end token positions of n-grams to the entity types associated with the n-grams;
inverting the first mapping mechanism to generate a second mapping mechanism that maps the entity types associated with the n-grams to the start token positions and the end token positions of the n-grams; and
modifying the second mapping mechanism to generate a third mapping mechanism that maps the entity types associated with the n-grams and the start token positions of the n-grams to the end token positions of the n-grams.

10. The server of claim 9, wherein:
generating the first mapping mechanism comprises generating a chart parse;
inverting the first mapping mechanism comprises inverting the chart parse to generate an inverse chart parse; and
modifying the second mapping mechanism comprises augmenting the inverse chart parse to generate an augmented inverse chart parse.

11. The server of claim 8, wherein identifying the grammar rules that match the search query comprises filtering out grammar rules that do not include all the entity types specified in the mapping.

12. The server of claim 11, wherein identifying the grammar rules comprises verifying that the grammar rules that include all the entity types specified in the mapping do not include additional entity types that are not specified in the mapping.

13. The server of claim 12, wherein identifying the grammar rules comprises determining that the search query matches a grammar rule if the grammar rule specifies all the entity types in the mapping and the grammar rule specifies no additional entity types.

14. The server of claim 8, wherein:
the storage device further comprises a category data store that stores the query categories in association with search server IDs that identify category-specific search servers that are configured to provide search results for search queries in the query category associated with the category-specific search server; and
the computer-readable instructions further cause the processing device to:
query the category data store with the query category and receive a search server ID associated with the query category; and
transmit the search request to the category-specific search server identified by the search server ID.

15. The server of claim 14, wherein the computer-readable instructions further cause the processing device to:
receive a search result object from the category-specific search server in response to transmitting the search request to the category-specific search server; and
transmit the search result object to a mobile computing device that initiated the search query, wherein the search result object comprises one or more access mechanisms, each access mechanism providing access to an application that executes on the mobile computing device.

16. A computer program product encoded on a non-transitory computer readable storage medium comprising instructions that when executed by a processing device cause the processing device to perform operations comprising:
storing, at the computer readable storage medium, a keyword data store that stores a plurality of keywords, wherein each keyword is associated with an entity type, the entity type representing a category of entities, an entity being a physical object or a logical object;
storing, at the computer readable storage medium, a grammar data store that stores grammar rules, wherein each grammar rule specifies one or more entity types and each grammar rule is associated with an access mechanism that provides access to an application;
receiving, at the processing device, a search request via a network communication device, the search request comprising a search query with one or more search terms;
generating, at the processing device, tokens by splitting the search terms with a defined delimiter, wherein each token is associated with a token position that indicates a location of the token within the search query;
generating, at the processing device, n-grams by selecting individual tokens and/or contiguous sequences of tokens, wherein each n-gram is associated with a start token position that indicates a start location of the first token of the n-gram within the search query and an end token position that indicates an end location of the last token of the n-gram within the search query;
querying, by the processing device, the keyword data store with the n-grams;
receiving, at the processing device, the entity types for n-grams that correspond with keywords stored in the keyword data store;
generating, at the processing device, a mapping that maps the received entity types and the start token positions of the n-grams corresponding with the received entity types to the end token positions of the n-grams corresponding with the received entity types;
identifying, by the processing device, grammar rules that match the search query by querying the grammar data store for grammar rules that specify the entity types included in the mapping; and
transmitting, via the network communication device, a search result object that comprises access mechanisms that are associated with the grammar rules that match the search query.

17. The computer program product of claim 16, wherein generating the mapping comprises:
generating a first mapping mechanism that maps the start token positions and the end token positions of n-grams to the entity types associated with the n-grams;
inverting the first mapping mechanism to generate a second mapping mechanism that maps the entity types associated with the n-grams to the start token positions and the end token positions of the n-grams; and
modifying the second mapping mechanism to generated a third mapping mechanism that maps the entity types associated with the n-grams and the start token positions of the n-grams to the end token positions of the n-grams.

18. The computer program product of claim 17, wherein:
generating the first mapping mechanism comprises generating a chart parse;
inverting the first mapping mechanism comprises inverting the chart parse to generate an inverse chart parse; and
modifying the second mapping mechanism comprises augmenting the inverse chart parse to generate an augmented inverse chart parse.

19. The computer program product of claim 16, wherein identifying the grammar rules that match the search query comprises:
filtering out grammar rules that do not include all the entity types specified in the mapping;
verifying that the grammar rules that include all the entity types specified in the mapping do not include additional entity types that are not specified in the mapping; and
determining that the search query matches a grammar rule if the grammar rule specifies all the entity types in the mapping and the grammar rule specifies no additional entity types.

20. The computer program product of claim 16, wherein transmitting the search result object comprises:
instantiating a data container;
retrieving the access mechanisms for the matching grammar rules from the grammar data store; and
writing the access mechanisms to the data container.

* * * * *